Figure 1:
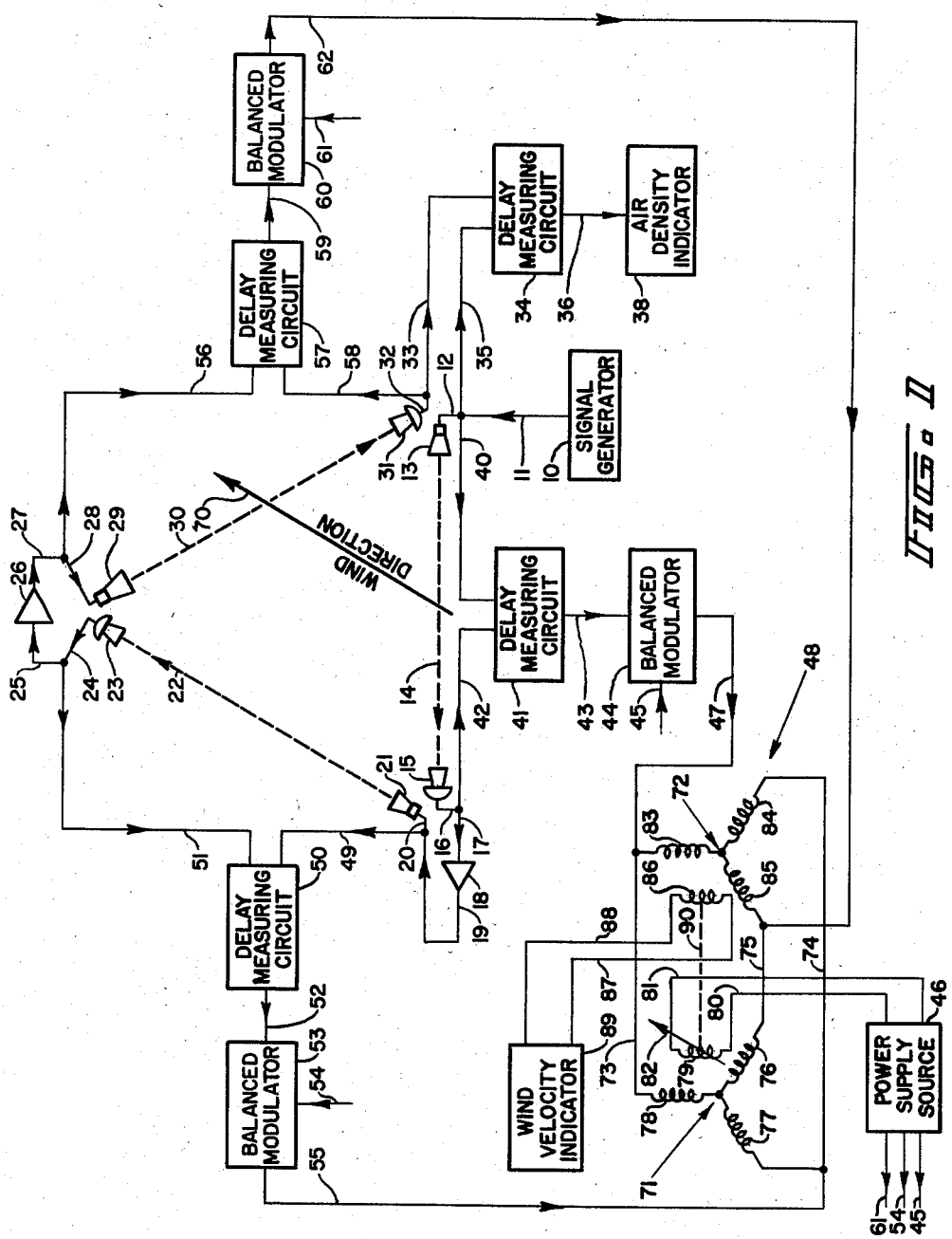

March 15, 1960 R. T. CAVANAGH ET AL 2,928,277
METEOROLOGICAL APPARATUS
Filed July 11, 1958 2 Sheets-Sheet 2

INVENTORS.
ROBERT TERENCE CAVANAGH
ROBERT WILLIAM DEICHERT
BY
Darby + Darby
ATTORNEYS.

United States Patent Office 2,928,277
Patented Mar. 15, 1960

2,928,277

METEOROLOGICAL APPARATUS

Robert Terrance Cavanagh, Pompton Plains, and Robert William Deichert, Jersey City, N.J., assignors to Allen B. Du Mont Laboratories, Inc., Clifton, N.J., a corporation of Delaware Application July 11, 1958, Serial No. 747,933

16 Claims. (Cl. 73—170)

This invention relates generally to meteorological apparatus, and more particularly to apparatus for measuring wind velocity and air density.

Standard types of wind velocity measuring apparatus generally depend for their operation upon mechanical movement of an element, or elements, in response to the magnitude and/or direction of the wind velocity being measured. Since wind velocity is a vector quantity, its complete determination requires determinations of both magnitude and direction. For example, anemometers of the cup and plate types provide an indication of the magnitude of wind velocity, while anemoscopes, such as wind vanes, provide an indication of the direction of wind velocity. In each of these types of wind velocity measuring apparatus, however, several moving parts are exposed to the atmosphere, so that adverse atmospheric conditions may affect the operation and the accuracy of the apparatus. This proves especially troublesome during operation in the Arctic and Antarctic regions, where very low air temperatures are encountered. The low air temperatures impose severe lubrication problems for the exposed moving parts and may produce ice formations on the parts, thus requiring repeated ice purging operations.

Accordingly, it is an object of this invention to provide apparatus for measuring wind velocity, which apparatus is relatively unaffected in operation by adverse atmospheric conditions.

It is a further object of this invention to provide apparatus for measuring wind velocity, which apparatus is extremely accurate in operation and requires little maintenance during cold-climate operation.

It is a still further object of this invention to provide apparatus for measuring both wind velocity and air density, which apparatus is relatively unaffected in operation by adverse atmospheric conditions.

The invention disclosed herein is based upon the principle that the transmission time of sound waves in air along a path of given length is dependent solely upon the density of the air, in the absence of a wind velocity having a component parallel to the path. Should a wind velocity exist having a component parallel to the path, the transmission time of the sound waves along the path will be increased or decreased, depending upon the direction of the wind velocity component relative to the direction of sound propagation along the path. This effectively means that, for constant air density, the transmission time of sound waves in air along a path of given length is a function of a component of wind velocity parallel to the path. Accordingly, if sound waves are transmitted along a plurality of non-parallel paths coplanar with a wind velocity to be measured, the transmission times of the sound waves along the paths will be functions of the components of wind velocity parallel to those paths, assuming the air density for each path to be the same, which would be the case for paths located in a reasonably small area.

Briefly, the invention comprises transmitter means for transmitting sound waves along a plurality of non-parallel paths coplanar with the wind velocity to be measured and receiver means for each of the paths for receiving the sound waves transmitted therealong. Transmission time responsive means are provided for each path for producing a signal which is a function of the transmission time of the sound waves along the path. This signal will then be a function of a component of the wind velocity being measured parallel to the path. This signals from all the transmission time responsive means, therefore, define those components of the wind velocity which have the same relative angular spatial relationships as the paths themselves. Signal combining means are provided to vectorially combine the signals from the transmission time responsive means in the same relative angular spatial relationships as the paths, so that the resultant signal produced has magnitude and direction corresponding respectively to the magnitude and direction of the wind velocity being measured. Finally, indicating means responsive to the magnitude and direction of the resultant signal from the signal combining means may be provided, to indicate the magnitude and direction of the wind velocity.

The invention also contemplates the measurement of air density. In order to accomplish this, the sound transmitter means and sound receiver means are arranged to form a polygon and sound waves originating at one vertex of the polygon are transmitted around the entire polygon back to the same vertex. Additional transmission time responsive means are provided to produce a signal which is a function of the transmission time of the sound waves around the entire polygon. This signal is a function of air density, but is not a function of wind velocity, since the sound waves are transmitted along a path which is closed on itself. While the transmission time of the sound waves along each side of the polygon may be affected by a component of wind velocity parallel to that side, the transmission time for the entire polygon is not affected, because the summation of the wind velocity components around a closed geometric figure, such as a polygon, must necessarily cancel out to leave a zero resultant. Accordingly, the signal from the additional transmission time responsive means may be applied to indicating means for indicating air density.

Figure 2:
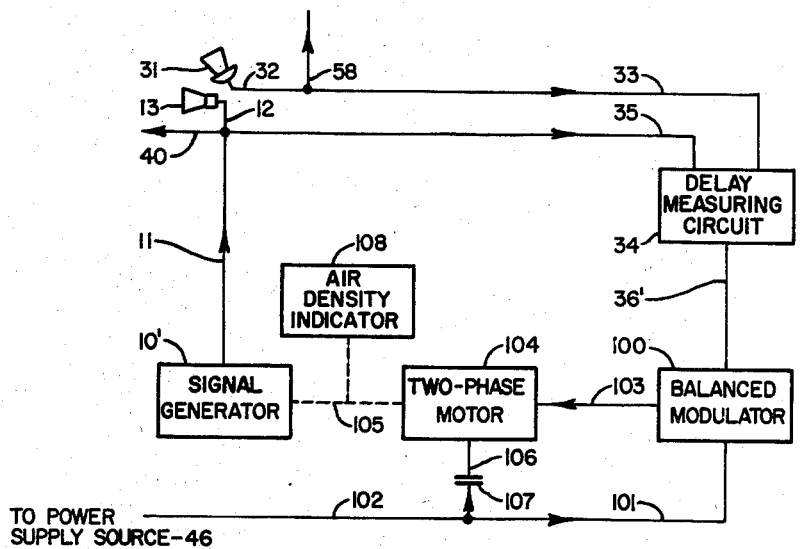

In the drawings:

Fig. 1 is a schematic diagram of apparatus for measuring both wind velocity and air density; and Fig. 2 is a schematic diagram of a portion of the apparatus of Fig. 1 showing an alternative arrangement for indicating the measured air density.

Referring now to Fig. 1 of the drawing, there is shown a signal generator 10 coupled by leads 11 and 12 to an electroacoustic transducer 13. Transducer 13, which may be a loudspeaker as illustrated, is located at one vertex of an equilateral triangle and is adapted to transmit sound waves along a path 14 forming one leg of the triangle. The signal generator 10 is adapted to produce electric signals for driving loudspeaker 13 and may comprise any convenient source of signals such as an oscillator or pulse generator, for example. It will be assumed that the signal generator produces sinusoidal signals, so that the sound waves transmitted along path 14 are also sinusoidal. A second electroacoustic transducer 15 is located at another vertex of the triangle and is arranged to receive the sound waves transmitted along path 14. Transducer 15 may comprise a microphone, as illustrated, and has its output coupled to a loudspeaker 21 located at the same vertex, by leads 16 and 17, amplifier 18, and leads 19 and 20. Amplifier 18 may be of any suitable type having a band-pass characteristic capable of passing the output signals from microphone 15. The loudspeaker 21 is arranged to transmit sinusoidal sound waves along a path 22, which forms the second leg of the equilateral triangle. A microphone 23, located at another vertex, receives the sound waves and converts them to corresponding electric signals, which are coupled by leads 24 and 25, amplifier 26, and leads 27 and 28 to a loudspeaker 29 located at the same vertex. Loudspeaker 29 is arranged to transmit sound waves along a path 30, forming the third leg of the triangle, to a microphone 31 located at the same vertex as loudspeaker 13. By means of the foregoing arrangement, sound waves from loudspeaker 13 are transmitted around the legs of the triangle to the microphone 31, so that a closed transmission path is formed.

The electric output signals from microphone 31 are coupled by leads 32 and 33 to a delay measuring circuit 34, which also receives the electric signals from signal generator 10, by means of leads 11 and 35. Delay measuring circuit 34 operates to produce an output signal which is a function of the transmission time of the sound waves around the legs of the triangle. Since the electric signals from generator 10 are sinusoidal, the effect of converting them into corresponding sinusoidal sound waves and transmitting the sound waves around the legs of the triangle, is to cause a phase shift between the signals from generator 10 and the output signals from microphone 31. Accordingly, this phase shift is a measure of the transmission time of the sound waves around the triangle and therefore, delay measuring circuit 34 may comprise a conventional phase comparator circuit, such as shown in Fig. 22–16 on page 483 of "Electron-Tube Circuits," by Seely, McGraw-Hill Book Company, Inc., 1950. It is to be understood however, that the transmission time measuring function of the delay measuring circuit could be performed by any suitable means, depending of course, on the character of the signals from signal generator 10. The output signals from the delay measuring circuit are coupled by lead 36 to a suitable air density indicator 38. When the delay measuring circuit comprises a phase comparator circuit, as referred to above, the output signal is a reversible polarity D.C. signal and the air density indicator may then take the form of a simple center-scale reading D.C. meter, for example.

As thus far described, the apparatus of the invention permits sound waves originating at loudspeaker 13 to be transmitted around the legs of an equilateral triangle and received at microphone 31. The output signal from the delay measuring circuit 34 is then a function of air density and the electrical time delay caused by the coupling circuits linking the microphones and loudspeakers at the vertices of the triangle. Any effects on the transmission time due to wind velocity are eliminated because the sound waves traverse a path which is closed upon itself. Therefore, the increases or decreases in transmission time of the waves along the individual paths 14, 22 and 30, due to the components of wind velocity lying parallel to those paths, cancel each other out, leaving only air density as the determining factor in transmission time. When operating the apparatus to measure air density, the transmission time for air of known density is determined first to obtain a base or reference value and the zero or center-scale point of the air density indicator 38 calibrated with this value. Since the electrical delay in transmission time due to the coupling circuits remains fixed, any change in the reference transmission time is due solely to changes in air density and may be read directly on the scale of meter 38.

If desired, the air density indicator of Fig. 1 could be replaced by the arrangement shown in Fig. 2 of the drawing. As seen in Fig. 2, the reversible polarity D.C. signal output of delay measuring circuit 34 is applied by a lead 36' to the input of a balanced modulator 100, which converts the D.C. signals to corresponding 400 cycle A.C. signals. The modulator 100 may be of any suitable type, such as shown, for example, in Fig. 15–7 on page 325 of "Electron-Tube Circuits," by Seely, McGraw-Hill Book Company, Inc., 1950. A 400 cycle reference voltage for the modulator is obtained from a power supply source 46 (shown in Fig. 1), by means of leads 101 and 102. The A.C. output of modulator 100 is coupled by lead 103 to the control winding of a conventional two-phase induction motor 104. A 400 cycle voltage, which is 90° out of phase with the control winding voltage, is applied to the reference winding of the motor from source 46, by means of leads 102 and 106 and capacitor 107. The shaft of motor 104 is coupled mechanically, as indicated by dotted line 105, to an air density indicator 108 and a variable frequency signal generator 10'. In operation, the motor 104 varies the frequency of the output signals from generator 10' until the signals received from microphone 31 are in phase with the generator output signals. Thus, the motor tends to reduce the output from the delay measuring circuit to zero at all times. When the air density changes, the delay measuring circuit produces an output signal which drives the motor to restore the balance. Therefore, the position of the motor shaft is a function of air density and may be used with indicator 108 to provide a visual indication of air density. To this end, the indicator 108 may comprise a simple calibrated scale and pointer arrangement. The signal generator 10' may be a simple oscillator which has an element in its tank circuit varied by the motor 104 to produce variable frequency output signals.

In measuring the magnitude and direction of wind velocity, the invention provides means, as shown in Fig. 1, for separately measuring the transmission time of the sound waves along each of paths 14, 22 and 30. The paths 14, 22 and 30 are arranged to be coplanar with the wind velocity being measured, so that if surface wind velocity is to be measured, the paths lie in the plane of the surface. Accordingly, to measure the transmission time of the sound waves along path 14, the output of signal generator 10 is coupled by leads 11 and 40 to a delay measuring circuit 41, which may be the same as delay measuring circuit 34. The output of microphone 15 is coupled to the delay measuring circuit by leads 16 and 42, so that the D.C. output signal from the measuring circuit is a function of the phase shift between the signals applied to loudspeaker 13 and the signals received from microphone 15. A lead 43 couples the output of the delay measuring circuit to a balanced modulator 44 which converts the D.C. output signals from the measuring circuit to amplitude modulated 400 cycle signals. The modulator 44 may be of the same type as modulator 100, shown in Fig. 2. A 400 cycle reference voltage for the modulator is obtained from power supply source 46, by means of a lead 45. The output signal from the modulator is applied by lead 47 to a signal combining device, indicated generally as 48, the purpose of which will be explained hereinafter.

The delay measuring circuit 50, associated with path 22, is coupled by leads 20 and 49 to the input of loudspeaker 21 and by leads 24 and 51 to the output of microphone 23, so that it produces an output signal which is a function of the transmission time of the sound waves along path 22. A balanced modulator 53 is coupled by lead 52 to the output of the measuring circuit and receives a 400 cycle reference voltage from power supply source 46 by a lead 54. The output of the modulator is coupled to the signal combining device 48 by lead 55. Similarly, a delay measuring circuit 57 is coupled to the input of loudspeaker 29 by leads 28 and 56 and to the output of microphone 31 by leads 32 and 58, so that it measures the transmission time of the sound waves along path 30. The output of the measuring circuit is coupled by lead 59 to a balanced modulator 60, which receives its 400 cycle reference voltage from the power supply source 46 by lead 61. A lead 62 applies the amplitude modulated 400 cycle signal from modulator 60 to the signal combining device 48.

It may be noted at this point, that the three signals applied to the signal combining device 48 are 400 cycle A.C. signals which have amplitudes dependent upon the transmission times of the sound waves along the paths 14, 22 and 30. Assuming that the air density is the same for all paths, which would be true if the paths were of reasonable length, and that no wind velocity exists, it is apparent that the transmission time for each path would be the same, since the paths are of equal length. Accordingly, the three signals applied to signal combining device 48 would have equal amplitudes. If the air density changes, the amplitudes of the signals will change, but will still be equal in amplitude with respect to each other. Assuming now that a wind velocity exists, as indicated for example by the vector 70, it is apparent that components of the wind velocity 70 will affect the transmission times for the paths 14, 22 and 30 in an unequal manner. Whenever the wind velocity can be resolved into components parallel to the paths, it will increase or decrease the transmission times of the paths by amounts proportional to the magnitudes of the components. Therefore, each of the three signals serves to represent the magnitude of the wind velocity component parallel to the path from which the signal was obtained. Accordingly, if the three signals are vectorially combined in the same relative angular spatial relationships as the paths 14, 22 and 30, a resultant signal is obtained which has magnitude and direction corresponding to the magnitude and direction of the wind velocity.

Signal combining device 48 operates to vectorially combine the three amplitude modulated signals from modulators 44, 53 and 60. As shown in the drawing, the device comprises a synchronous machine 71, which may be a synchro motor, and a synchronous machine 72, which may be a synchro control transformer. Synchro motor 71 comprises stator windings 76, 77 and 78 and rotor winding 79, while synchro control transformer 72 comprises stator windings 83, 84 and 85 and rotor winding 86. The stator windings of each synchronous machine are Y-connected in the conventional manner and are coupled together by leads 73, 74 and 75, so that they are energized by the output signals from the balanced modulators 44, 53 and 60. Therefore, the stator windings in each machine convert the amplitude modulated 400 cycle signals from the modulators into corresponding magnetic fields. Since the stator windings of each machine have the same relative angular spatial relationships as the paths 14, 22 and 30, a resultant magnetic field is produced in each machine, which has magnitude and direction corresponding to the wind velocity 70. In this regard, it may be noted that the three signals obtained from the modulators are quite similar to the signals obtained from the stator windings of a conventional synchro generator, having its rotor winding oriented in the direction of wind velocity.

If now the rotor winding 79 of synchro motor 71 is coupled to the 400 cycle power supply source 46 by leads 80 and 81, it will rotate to align itself in the direction of the resultant magnetic field produced by stator windings 76, 77 and 78. Since the resultant magnetic field in the synchro motor has the same direction as the wind velocity 70, the angular position of the rotor represents the direction of wind velocity. This position may be indicated by any suitable means, such as the pointer 82, for example. The rotors of the two synchronous machines are mechanically interconnected by any suitable means, as indicated schematically by the dashed line 90, so that rotor winding 86 of the synchro control transformer 72 has induced in it a signal proportional to the magnitude of the resultant magnetic field. Leads 87 and 88 serve to couple the output signal from rotor winding 86 to a suitable indicator 89, which may comprise a simple A.C. meter, for example. Since the magnitude of the resultant magnetic field produced in the control transformer is a function of the magnitude of wind velocity 70, the indicator 89 provides an indication of the magnitude of wind velocity. Accordingly, indicator 82 indicates the direction of wind velocity and indicator 89 indicates the magnitude of wind velocity, thereby completely defining wind velocity as a vector quantity.

It is believed apparent that many changes could be made in the above apparatus and many seemingly different embodiments of the invention constructed without departing from the scope thereof. For example, the triangular configuration of the sound paths could be replaced by any plane geometric figure, such as a polygon, and the signal combining means modified accordingly. Furthermore, the signal combining means need not be restricted to the form illustrated and described, since other devices, such as a cathode-ray oscilloscope, for example, could be employed to vectorially combine the signals representing the transmission times of the sound waves along the paths. Additionally, 400 cycle voltages need not be employed for the synchronous machines and balanced modulators, since it is only necessary that the same frequency be employed for both. It is therefore intended that all matter contained in the above description or shown in the accompanying drawing shall be interpreted as illustrative and not in a limiting sense.

What is claimed is:

1. Apparatus for measuring wind velocity comprising transmitter means for transmitting sound waves along a plurality of non-parallel equal paths having equi-angular spatial relationships, said paths being coplanar with the wind velocity being measured; receiver means for each of said paths for receiving the sound waves transmitted therealong; transmission time responsive means comprising delay measuring circuits associated with each of said paths, said transmission time responsive means being coupled between the transmitter means and receiver means of the path associated therewith and being operable to produce a signal at its output which is a function of the transmission time of the sound waves along that path, the signal from said transmission time responsive means thereby also being a function of a component of the wind velocity being measured parallel to that path; and signal combining means coupled to the outputs of said transmission time responsive means for vectorially combining the signals therefrom in the same relative angular spatial relationships as said paths, to thereby produce a resultant signal having magnitude and direction corresponding respectively to the magnitude and direction of the wind velocity being measured.

2. Apparatus for measuring wind velocity comprising transmitter means for transmitting sound waves along a plurality of non-parallel equal paths having fixed equi-angular spatial relationships, said paths being coplanar with the wind velocity being measured; receiver means for each of said paths for receiving the sound waves transmitted therealong; transmission time responsive means comprising delay measuring circuits associated with each of said paths, said transmission time responsive means being coupled between the transmitter means and receiver means of the path associated therewith and being operable to produce a signal at its output which is a function of the transmission time of the sound waves along that path, the signal from said transmission time responsive means thereby also being a function of a component of the wind velocity being measured parallel to that path; signal combining means coupled to the outputs of said transmission time responsive means for vectorially combining the signals therefrom in the same relative angular spatial relationships as said paths, to thereby produce a resultant signal having magnitude and direction corresponding respectively to the magnitude and direction of the wind velocity being measured; and indicating means coupled to said signal combining means for indicating the magnitude and direction of the wind velocity being measured, said indicating means being responsive to the magnitude and direction of the resultant signal produced in said signal combining means.

3. Apparatus for measuring wind velocity comprising transmitter means for transmitting sound waves along a plurality of non-parallel equal paths having fixed equiangular spatial relationships, said paths being coplanar with the wind velocity being measured; receiver means for each of said paths for receiving the sound waves transmitted therealong; transmission time responsive means comprising delay measuring circuits associated with each of said paths, said transmission time responsive means being coupled between the transmitter means and receiver means of the path associated therewith and being operable to produce a signal at its output which is a function of the transmission time of the sound waves along that path, the signal from said transmission time responsive means thereby also being a function of a component of the wind velocity being measured parallel to that path; electromechanical transducer means having a stator winding for each of said transmission time responsive means and at least one rotor winding, said stator windings having the same relative angular spatial relationships as said paths, said rotor winding being adapted to be coupled to a power supply source; coupling means for coupling said stator windings to the outputs of said transmission time responsive means, so that said transducer means produces a resultant magnetic field having magnitude and direction corresponding respectively to the magnitude and direction of the wind velocity being measured; and indicating means coupled to said electromechanical transducer means for indicating the magnitude and direction of the wind velocity being measured, said indicating means being responsive to the magnitude and direction of the resultant magnetic field produced in said transducer means.

4. Apparatus for measuring wind velocity comprising three pairs of electroacoustic transducers arranged to form an equilateral triangle coplanar with the wind velocity being measured, each of said pairs of transducers comprising a sound transmitter and a sound receiver located at one of the vertices of the triangle, said sound transmitter being adapted to transmit sound waves along one leg of the triangle to the receiver located at one of the remaining vertices of the triangle, said sound receiver being adapted to receive sound waves transmitted along another leg of the triangle by the transmitter located at the other of the remaining vertices, so that sound waves may be transmitted along each leg of the triangle; signal generating means coupled to said electroacoustic transducers for causing the sound transmitters to transmit sound waves; delay measuring means for each leg of the triangle, said delay measuring means being coupled between the transmitter and receiver for the leg associated therewith and being operable to produce a signal at its output which is a function of the transmission time of the sound waves along that leg, the signal from said delay measuring means thereby also being a function of a component of the wind velocity being measured parallel to that leg; and signal combining means coupled to the outputs of said delay measuring means for vectorially combining the signals therefrom in the same relative angular spatial relationships as the legs of the equilateral triangle, to thereby produce a resultant signal having magnitude and direction corresponding respectively to the magnitude and direction of the wind velocity being measured.

5. Apparatus for measuring wind velocity comprising three pairs of electroacoustic transducers arranged to form an equilateral triangle coplanar with the wind velocity being measured, each of said pairs of transducers comprising a sound transmitter and a sound receiver located at one of the vertices of the triangle, said sound transmitter being adapted to transmit sound waves along one leg of the triangle to the receiver located at one of the remaining vertices of the triangle, said sound receiver being adapted to receive sound waves transmitted along another leg of the triangle by the transmitter located at the other of the remaining vertices, so that sound waves may be transmitted along each leg of the triangle; signal generating means coupled to said electroacoustic transducers for causing the sound transmitters to transmit sound waves; delay measuring means for each leg of the triangle, said delay measuring means being coupled between the transmitter and receiver for the leg associated therewith and being operable to produce a signal at its output which is a function of the transmission time of the sound waves along that leg, the signal from said delay measuring means thereby also being a function of a component of the wind velocity being measured parallel to that leg; signal combining means coupled to the outputs of said delay measuring means for vectorially combining the signals therefrom in the same relative angular spatial relationships as the legs of the equilateral triangle, to thereby produce a resultant signal having magnitude and direction corresponding respectively to the magnitude and direction of the wind velocity being measured; and indicating means coupled to said signal combining means for indicating the magnitude and direction of the wind velocity being measured, said indicating means being responsive to the magnitude and direction of the resultant signal produced in said signal combining means.

6. Apparatus for measuring wind velocity comprising three pairs of electroacoustic transducers arranged to form an equilateral triangle coplanar with the wind velocity being measured, each of said pairs of transducers comprising a sound transmitter and a sound receiver located at one of the vertices of the triangle, said sound transmitter being adapted to transmit sound waves along one leg of the triangle to the receiver located at one of the remaining vertices of the triangle, said sound receiver being adapted to receive sound waves transmitted along another leg of the triangle by the transmitter located at the other of the remaining vertices, so that sound waves may be transmitted along each leg of the triangle; signal generating means coupled to said electroacoustic transducers for causing the sound transmitters to transmit sound waves; delay measuring means for each leg of the triangle, said delay measuring means being coupled between the transmitter and receiver for the leg associated therewith and being operable to produce an amplitude modulated A.C. signal at its output which is a function of the transmission time of the sound waves along that leg, the signal from said delay measuring means thereby also being a function of a component of the wind velocity being measured parallel to that leg; electromechanical transducer means having three stator windings and at least one rotor winding, said stator windings having the same relative angular spatial relationships as the legs of the equilateral triangle, said rotor winding being adapted to be coupled to an A.C. power supply source having the same frequency and phase as the signals from said delay measuring means; coupling means for coupling said stator windings to the outputs of said delay measuring means, so that said electromechanical transducer means produces a resultant magnetic field having magnitude and direction corresponding respectively to the magnitude and direction of the wind velocity being measured; and indicating means coupled to said electromechanical transducer means for indicating the magnitude and direction of the wind velocity being measured, said indicating means being responsive to the magnitude and direction of the resultant magnetic field produced in said electromechanical transducer means.

7. Apparatus for measuring wind velocity comprising three pairs of electroacoustic transducers arranged to form an equilateral triangle coplanar with the wind velocity being measured, each of said pairs of transducers comprising a sound transmitter and a sound receiver located at one of the vertices of the triangle, said sound transmitter being adapted to transmit sound waves along one leg of the triangle to the receiver located at one of the remaining vertices of the triangle, said sound receiver being adapted to receive sound waves transmitted along another leg of the triangle by the transmitter located at the other of the remaining vertices, so that sound waves may be transmitted along each leg of the triangle; signal generating means coupled to said electroacoustic transducers for causing the sound transmitters to transmit sinusoidal sound waves, said signal generating means including at least one source of A.C. signals; a delay measuring circuit for each leg of the triangle, said delay measuring circuit being coupled between the input to the transmitter and the output of the receiver for the leg associated therewith and being operable to produce a D.C. signal at its output which is a function of the phase difference between the input signal to the transmitter and the output signal from the receiver for the leg associated therewith, the signal from said delay measuring circuit thereby being a function of the transmission time of the sound waves along that leg and of a component of the wind velocity being measured parallel to that leg; a modulator circuit for each of said delay measuring circuits, said modulator circuit being coupled to the output of the delay measuring circuit associated therewith and being operable to convert the D.C. signals received therefrom into corresponding amplitude modulated A.C. signals; a pair of synchronous machines each having three stator windings and a single rotor winding, the stator windings of each machine having the same relative angular spatial relationships as the legs of the equilateral triangle, the rotor winding of one of said machines being adapted to be coupled to an A.C. power supply source having the same frequency and phase as the signals from said modulator circuits; coupling means for coupling the stator windings of each of said machines to the outputs of said modulator circuits, so that each machine produces a resultant magnetic field having magnitude and direction corresponding respectively to the magnitude and direction of the wind velocity being measured; means for mechanically interconnecting the rotor windings of said machines, so that the rotor winding of the other of said machines has a signal induced therein which is a function of the magnitude of the resultant magnetic field produced in each machine; first indicating means coupled to the rotor winding of said other of said machines for indicating the magnitude of the wind velocity being measured; and second indicating means responsive to the position of said rotor windings for indicating the direction of the wind velocity being measured.

8. Apparatus for measuring wind velocity comprising three pairs of electroacoustic transducers arranged to form an equilateral triangle coplanar with the wind velocity being measured, each of said pairs of transducers comprising a loudspeaker and a microphone located at one of the vertices of the triangle, said loudspeaker being adapted to transmit sound waves along one leg of the triangle to the microphone located at one of the remaining vertices of the triangle, said microphone being adapted to receive sound waves transmitted along another leg of the triangle by the loudspeaker located at the other of the remaining vertices, so that sound waves may be transmitted along each leg of the triangle; a signal generator; means for coupling said signal generator to the loudspeaker located at one vertex of the triangle, so that the loudspeaker transmits sound waves; means located at the other two vertices of the triangle for coupling the output of the microphone at each of the two vertices to the input of the loudspeaker located at the same vertex, so that the sound waves transmitted from the loudspeaker at said one vertex of the triangle are transmitted around the legs of the triangle to the microphone located at said one vertex; delay measuring means for each leg of the triangle, said delay measuring means being coupled between the input to the loudspeaker and the output from the microphone for the leg associated therewith and being operable to produce a signal at its output which is a function of the transmission time of the sound waves along that leg, the signal from said delay measuring means thereby also being a function of a component of the wind velocity being measured parallel to that leg; and signal combining means coupled to the outputs of said delay measuring means for vectorially combining the signals therefrom in the same relative angular spatial relationships as the legs of the equilateral triangle, to thereby produce a resultant signal having magnitude and direction corresponding respectively to the magnitude and direction of the wind velocity being measured.

9. Apparatus for measuring wind velocity as claimed in claim 8, wherein said signal generator is operable to produce sinusoidal output signals, so that said loudspeakers transmit sinusoidal sound waves, and wherein said delay measuring means includes a phase comparator circuit adapted to produce an output signal which is a function of the phase difference between the input signal to the loudspeaker and the output signal from the microphone for the leg of the triangle associated therewith.

10. Apparatus for measuring wind velocity and air density comprising a plurality of sound transmitters arranged to form a regular polygon coplanar with the wind velocity being measured, each of said sound transmitters being located at one of the vertices of the polygon and being operable to transmit sound waves along one side of the polygon; a sound receiver located at each of the vertices of the polygon and operable to receive the sound waves transmitted along one side of the polygon; means for coupling the outputs of the sound receivers at all but one of the vertices of the polygon to the inputs of the sound transmitters located at the same vertices, so that the sound waves transmitted from the transmitter at said one vertex of the polygon are transmitted around the sides of the polygon to the receiver located at said one vertex; transmission time responsive means associated with each of the sides of the polygon, said transmission time responsive means being coupled between the transmitter and receiver for the side associated therewith and being operable to produce a signal at its output which is a function of the transmission time of the sound waves along that side, the signal from said transmission time responsive means thereby also being a function of a component of the wind velocity being measured parallel to that side; signal combining means coupled to the outputs of said transmission time responsive means for vectorially combining the signals therefrom in the same relative angular spatial relationships as the sides of said polygon, to thereby produce a resultant signal having magnitude and direction corresponding respectively to the magnitude and direction of the wind velocity being measured; and additional transmission time responsive means coupled between the transmitter and receiver located at said one vertex of the polygon, said additional transmission time responsive means being operable to produce a signal at its output which is a function of the transmission time of the sound waves around the entire polygon, the signal from said additional transmission time responsive means thereby being a function of the air density being measured.

11. Apparatus for measuring wind velocity and air density as claimed in claim 10, which further comprises first indicating means coupled to said signal combining means and second indicating means coupled to the output of said additional transmission time responsive means, said first indicating means being responsive to the magnitude and direction of the resultant signal produced in said signal combining means and being operable to indicate the magnitude and direction of the wind velocity being measured, said second indicating means being responsive to the signal produced by said additional transmission time responsive means and being operable to indicate the air density being measured.

12. Apparatus for measuring wind velocity and air density comprising three pairs of electroacoustic transducers arranged to form an equilateral triangle coplanar with the wind velocity being measured, each of said pairs of transducers comprising a loudspeaker and a microphone located at one of the vertices of the triangle, said loudspeaker being adapted to transmit sound waves along one leg of the triangle to the microphone located at one of the remaining vertices of the triangle, said microphone being adapted to receive sound waves transmitted along another leg of the triangle by the loudspeaker located at the other of the remaining vertices, so that sound waves may be transmitted along each leg of the triangle; a signal generator; means for coupling said signal generator to the loudspeaker located at one vertex of the triangle, so that the loudspeaker transmits sound waves; means located at the other two vertices of the triangle for coupling the output of the microphone at each of the two vertices to the input of the loudspeaker located at the same vertex, so that the sound waves transmitted from the loudspeaker at said one vertex of the triangle are transmitted around the legs of the triangle to the microphone located at said one vertex; delay measuring means for each leg of the triangle, said delay measuring means being coupled between the input to the loudspeaker and the output from the microphone for the leg associated therewith and being operable to produce a signal at its output which is a function of the transmission time of the sound waves along that leg, the signal from said delay measuring means thereby also being a function of a component of the wind velocity being measured parallel to that leg; signal combining means coupled to the outputs of said delay measuring means for vectorially combining the signals therefrom in the same relative angular spatial relationships as the legs of the equilateral triangle, to thereby produce a resultant signal having magnitude and direction corresponding respectively to the magnitude and direction of the wind velocity being measured; and additional delay measuring means coupled between the input to the loudspeaker and the output from the microphone located at said one vertex of the triangle, said additional delay measuring means being operable to produce a signal at its output which is a function of the transmission time of the sound waves around the entire triangle, the signal from said additional delay measuring means thereby being a function of the air density being measured.

13. Apparatus for measuring wind velocity and air density as claimed in claim 12, wherein said signal generator is operable to produce sinusoidal output signals, so that said loudspeakers transmit sinusoidal sound waves, and wherein said additional delay measuring means comprises a phase comparator circuit adapted to produce an output signal which is a function of the phase difference between the input signal to the loudspeaker and the output signal from the microphone located at said one vertex of the triangle.

14. Apparatus for measuring air density comprising a plurality of pairs of electroacoustic transducers arranged to form a regular polygon, each of said pairs of transducers comprising a loudspeaker and a microphone located at one of the vertices of the polygon, said loudspeaker being adapted to transmit sound waves along one of the sides of the polygon forming the vertex at which said loudspeaker is located, said microphone being adapted to receive sound waves transmitted along the other of the sides of the polygon forming the vertex at which said microphone is located, so that sound waves may be transmitted along each side of the polygon; a signal generator; means for coupling said signal generator to the loudspeaker located at one vertex of the polygon, so that the loudspeaker transmits sound waves; means located at the remaining vertices of the polygon for coupling the output of the microphone at each of said remaining vertices to the input of the loudspeaker located at the same vertex, so that the sound waves transmitted from the loudspeaker at said one vertex of the polygon are transmitted around the entire polygon to the microphone located at said one vertex; and delay measuring means coupled between the input to the loudspeaker and the output from the microphone located at said one vertex of the polygon, said delay measuring means being operable to produce a signal at its output which is a function of the transmission time of the sound waves around the entire polygon, the signal from said delay measuring means thereby also being a function of the air density being measured.

15. Apparatus for measuring air density as claimed in claim 14, wherein said signal generator is operable to produce sinusoidal output signals, so that said loudspeakers transmit sinusoidal sound waves, and wherein said delay measuring means comprises a phase comparator circuit adapted to produce an output signal which is a function of the phase difference between the input signal to the loudspeaker and the output signal from the microphone located at said one vertex of the polygon.

16. Apparatus for measuring air density as claimed in claim 15, wherein said signal generator is a variable frequency signal generator and a motor is coupled to the signal generator to vary the frequency of the signals therefrom in response to the output signals from said phase comparator, so that the position of the shaft of said motor is a function of air density.

References Cited in the file of this patent

UNITED STATES PATENTS

| | | |
|---|---|---|
| 2,274,262 | Wolff | Feb. 24, 1942 |
| 2,841,775 | Saunders | July 1, 1958 |
| 2,869,357 | Kritz | Jan. 20, 1959 |

FOREIGN PATENTS

| | | |
|---|---|---|
| 1,012,054 | France | Apr. 9, 1952 |